US012764598B2

(12) United States Patent
Zhu et al.

(10) Patent No.: US 12,764,598 B2
(45) Date of Patent: Oct. 13, 2026

(54) QUALITY OF SERVICE MECHANISM FOR SUPPORTING EXTENDED REALITY TRAFFIC

(71) Applicant: ZTE Corporation, Shenzhen (CN)

(72) Inventors: Jinguo Zhu, Shenzhen (CN); Zhijun Li, Shenzhen (CN); Qiang Zhang, Shenzhen (CN); Jianfeng Zhou, Shenzhen (CN); Weibin Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 50 days.

(21) Appl. No.: 18/991,027

(22) Filed: Dec. 20, 2024

(65) Prior Publication Data

US 2025/0126513 A1 Apr. 17, 2025

Related U.S. Application Data

(63) Continuation of application No. PCT/CN2022/115239, filed on Aug. 26, 2022.

(51) Int. Cl.
*H04W 28/02* (2009.01)

(52) U.S. Cl.
CPC ............................... *H04W 28/0268* (2013.01)

(58) Field of Classification Search
CPC ................................................ H04W 28/0268
USPC ........................................................ 709/238
See application file for complete search history.

(56) References Cited

U.S. PATENT DOCUMENTS

2019/0378476 A1 12/2019 Jeon
2023/0319636 A1* 10/2023 Kahn ................ H04W 28/0925 370/329
2024/0340322 A1* 10/2024 Bouazizi ............. H04L 65/1069
2025/0279967 A1* 9/2025 Xu ........................ H04W 28/10
(Continued)

FOREIGN PATENT DOCUMENTS

CN 110971351 A 4/2020
WO 2021190422 A1 9/2021
WO WO-2023109749 A1 * 6/2023 ......... H04L 65/1059

OTHER PUBLICATIONS

EPO, Extended European Search Report for European Application No. 22 956 139.4, mailed on Jan. 16, 2026, 19 pages.
(Continued)

*Primary Examiner* — Nicholas P Celani
(74) *Attorney, Agent, or Firm* — Perkins Coie LLP

(57) ABSTRACT

Methods and systems for techniques for quality of service (QoS) for supporting extended reality (XR) traffic include a method of wireless communication that includes receiving, by a first network function, from a second network function, a first indication that activates an extended reality traffic transmission optimization by which an efficiency of a transmission of payloads of a set of protocol data units having different importance is increased, transmitting, by the first network function, to a network node a request to activate the extended reality traffic transmission optimization, receiving, by the first network function, from the network node, a response to the request to activate the extended reality traffic transmission optimization, and activating, by the first network function, the extended reality traffic transmission optimization in a third network function.

20 Claims, 11 Drawing Sheets

(56) References Cited

U.S. PATENT DOCUMENTS

| | | | | |
|---|---|---|---|---|
| 2025/0310031 | A1* | 10/2025 | Ma | H04L 65/65 |
| 2026/0075468 | A1* | 3/2026 | Prabhakar | H04W 28/24 |

OTHER PUBLICATIONS

Huawei et al., "KI #5, Sol #24: Update to clarify solution for differentiated QoS handling for different PDU Sets," 3GPP TSG-WG SA2 Meeting #152E, Elbonia, Aug. 17-26, 2022, S2-2206332, 4 pages.

Nokia et al., "KI#4 & 5 Solution Update," 3GPP SA WG2 Meeting #152E, e-meeting, Aug. 17-25, 2022, S2-2205938, 6 pages.

Lenovo, "Provision XR traffic configuration to 5GS," TSG SA WG2 Meeting #151E, Electronic Meeting, May 16-20, 2022, S2-2204214, 5 pages.

CMCC, "Consideration on XR-awareness in RAN," 3GPP TSG-RAN WG2 Meeting #119 Electronic, Online, Aug. 17-26, 2022, R2-2208443, 13 pages.

MediaTek Inc., "pCR 23.700-60: New KI and Solution for Usage of PDU Set feature in 5GS" SA WG2 Meeting #150E, Electronic, Elbonia, Apr. 6-12, 2022, S2-2202879, 4 pages.

International Search Report and Written Opinion for International Application No. PCT/CN2022/115239, mailed on May 20, 2023, 8 pages.

JPO, Office Action for Japanese Application No. 2024-572675, mailed on May 19, 2026, 10 pages with unofficial English translation.

3GPP, "3rd Generation Partnership Project; Technical Specification Group Services and System Aspects; Procedures for the 5G System (5GS); Stage 2, (Release 17)," 3GPP TS 23.502 V17.5.0, Jun. 2022, 1-83.

* cited by examiner

QUALITY OF SERVICE MECHANISM FOR SUPPORTING EXTENDED REALITY TRAFFIC

CROSS-REFERENCE TO RELATED APPLICATION

This application is a continuation and claims priority to International Application No. PCT/CN2022/115239, filed on Aug. 26, 2022, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for quality of service (QoS) for supporting extended reality (XR) traffic.

In one aspect, a method of data communication is disclosed. The method includes receiving, by a first network function, from a second network function, a first indication that activates an extended reality traffic transmission optimization by which an efficiency of a transmission of payloads of a set of protocol data units having different importance is increased; transmitting, by the first network function, to a network node, after receiving the first indication, a request to activate the extended reality traffic transmission optimization; receiving, by the first network function, from the network node, a response to the request to activate the extended reality traffic transmission optimization; and activating, by the first network function, after receiving the first indication, the extended reality traffic transmission optimization in a third network function to perform the transmission of payloads of a set of protocol data units based on an importance of the set of protocol data units.

In another aspect, a method of data communication is disclosed. The method includes receiving, by a third network function, an indication that activates an extended reality traffic transmission optimization by which an efficiency of a transmission of payloads of a set of protocol data units having different importance is increased; receiving, by the third network function, a first network packet of a data unit set of a data unit set group that includes a plurality of data unit sets; allocating, by the third network function, an identity of the data unit set and an identity of the data unit set group; and transmitting, by the third network function, to a network node, the identity of the allocated data unit set, the identity of the allocated data unit set group, and a corresponding network packet to perform the transmission of payloads of a set of protocol data units.

In another aspect, a method of data communication is disclosed. The method includes receiving, by a network node, an indication that activates an extended reality traffic transmission optimization by which an efficiency of a transmission of payloads of a set of protocol data units having different importance is increased; detecting, by the network node, whether there is a missing network packet; and canceling, by the network node, a scheduled transmission of remaining network packets in a same data unit set as the missing network packet, upon determining that the data unit set including the missing network packet has a first importance value, or canceling, by the network node, a scheduled transmission of remaining network packets in all data unit sets in a same data unit set group as the missing network packet, upon determining that the data unit set including the missing network packet has a second importance value, wherein the second importance value has a higher importance than the first importance value.

In another aspect, a method of data communication is disclosed. The method includes transmitting, by a wireless device, to a network device, an indication that the wireless device supports an extended reality traffic transmission optimization by which an efficiency of a transmission of payloads of a set of protocol data units having different importance is increased; receiving, by the wireless device, from the network device, after transmitting the indication, a notification that the extended reality traffic transmission optimization is activated for the wireless device; detecting, by the wireless device, whether there is a missing network packet; and canceling, by the wireless device, a scheduled transmission of remaining network packets in a same data unit set as the missing network packet, upon determining that the data unit set including the missing network packet has a first importance value, or canceling, by the network node, a scheduled transmission of remaining network packets in all data unit sets in a same data unit set group as the missing network packet, upon determining that the data unit set including the missing network packet has a second importance value, wherein the second importance value has a higher importance than the first importance value.

In another example aspect, a wireless communication apparatus comprising a processor configured to implement an above-described method is disclosed.

In another example aspect, a wireless communication apparatus comprising a memory and a processor, wherein the processor reads code from the memory and implements an above-described method is disclosed.

In another example aspect, a computer storage medium having code for implementing an above-described method stored thereon is disclosed.

These, and other, aspects are described in the present document.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

Figure 1:
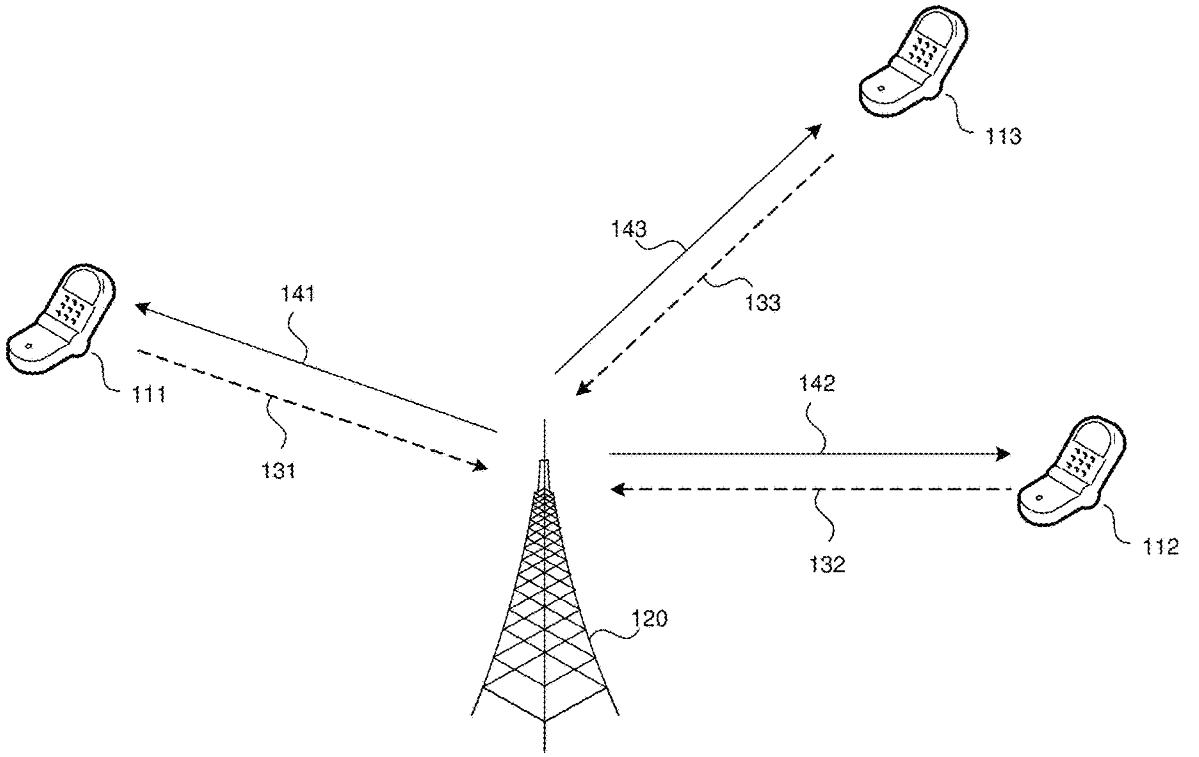
FIG. 1 shows an example of a wireless communication system based on some example embodiments of the disclosed technology.

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

Figure 2:
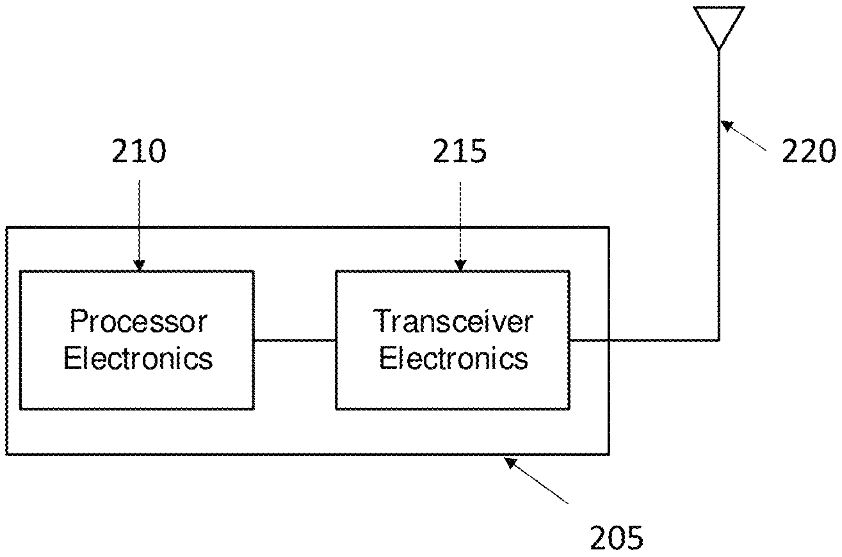
FIG. 2 is a block diagram representation of a portion of an apparatus based on some embodiments of the disclosed technology.

FIG. 2 is a block diagram representation of a portion of an apparatus based on some embodiments of the disclosed technology. An apparatus 205 such as a network device or a base station or a wireless device (or UE), can include processor electronics 210 such as a microprocessor that implements one or more of the techniques presented in this document. The apparatus 205 can include transceiver electronics 215 to send and/or receive wireless signals over one or more communication interfaces such as antenna(s) 220. The apparatus 205 can include other communication interfaces for transmitting and receiving data. Apparatus 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the apparatus 205.

In 5th generation (5G) mobile network, mobile media services, cloud AR/VR, cloud gaming, video-based telecontrol for machines or drones are expected to bring more and more traffic to 5G network. All media traffic has some common characteristics, which can be very useful for better transmission control and efficiency. However, 5G system (5GS) currently uses common QoS mechanisms to deliver media services per packet without taking media information into account thus it is not efficient to deliver the media service.

For example, packets within a frame have dependency with each other since the application needs all of these packets to decode the frame. Hence one packet loss will make other correlative packets useless even they are successfully transmitted. For example, extended reality (XR) applications impose requirements in terms of media units (e.g., Application Data Units), rather than in terms of single packets/protocol data units (PDUs).

As another example, packets of same video stream but different frame types (e.g., I frame, P frame) or even different positions in the GoP (Group of Picture) are of different contributions to user experience, and thus the QoS mechanism needs to be enhanced to handle this new type of traffic.

The disclosed technology can be implemented in some embodiments to provide a solution to enhance the existing QoS mechanism so the RAN can deliver the XR media service more efficiently.

Figure 3:
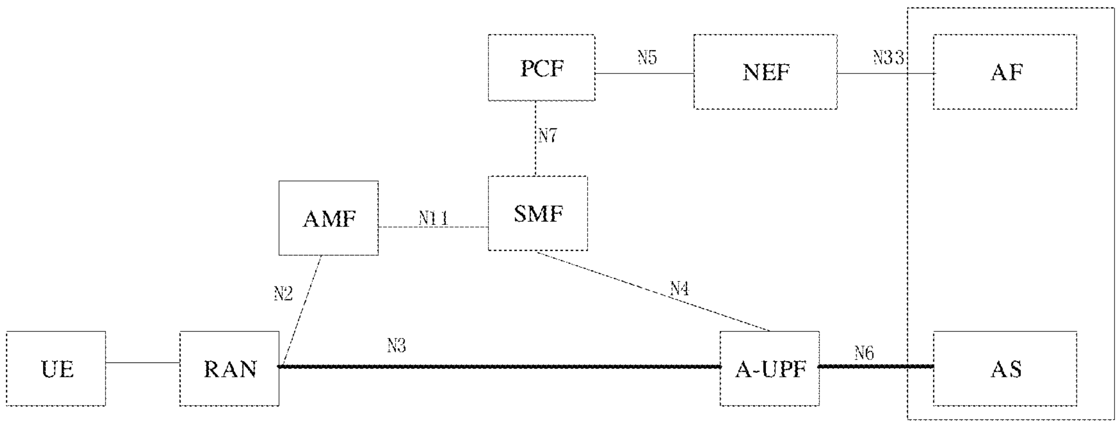
FIG. 3 shows an example architecture of 5th generation mobile network (5G) system.

FIG. 3 shows an example architecture of 5th generation mobile network (5G) system.

Referring to FIG. 3, 5th generation mobile network (5G) system may include User Equipment (UE), Radio Access Network (RAN), Access and Mobility Management function (AMF), Session Management Function (SMF), User plane function (UPF), Policy Control Function (PCF), Network Exposure Function (NEF), and Application Function (AF).

In some implementations, the RAN manages radio resources and delivers user data received over N3 interface to or from UE. The RAN performs mapping between Dedicated Radio Bearers (DRBs) and QoS flows in a PDU session.

In some implementations, the AMF includes the following functionalities: Registration management, Connection management, Reachability management and Mobility Management. This function also performs the access authentication and access authorization. The AMF is the NAS security termination and relay the SM NAS between UE and SMF, etc.

In some implementations, the SMF includes the following functionalities: session establishment, modification and release, UE IP address allocation and management (including optional authorization functions), selection and control of user plane (UP) function, downlink data notification, etc. The SMF controls the UPF via N4 association. The SMF provides Packet Detection Rule (PDR) to UPF to instruct how to detect user data traffic, Forwarding Action Rule (FAR), QoS Enforcement Rule (QER), Usage Reporting Rule (URR) to instruct the UPF how to perform the user data traffic forwarding, QoS handling and usage reporting for the user data traffic detected by using the PDR.

In some implementations, the UPF includes the following functionalities: serving as an anchor point for intra-/inter-radio access technology (RAT) mobility, packet routing & forwarding, traffic usage reporting, QoS handling for the user plane, downlink packet buffering and downlink data notification triggering, etc. GTP-U (general packet radio service (GPRS) tunnelling protocol user plane) tunnel is used over N3 interface between the RAN and UPF. The GTP-U tunnel is per PDU session. For downlink traffic the UPF binds the downlink traffic to QoS flows within the GTP-U tunnel of the PDU session by using the FARs received from SMF. For uplink traffic the RAN transfer the user plane traffic to QoS flows identified by the UE.

In some implementations, the PCF provides QoS policy rules to control plane functions to enforce the rules. The PCF(s) transform(s) the AF requests into PCC rules that apply to PDU Sessions.

In some implementations, the NEF provides security mechanism to third party AF to access the 3GPP network. The NEF may authenticate and authorize the Application Functions.

In some implementations, the AF interacts with the 3GPP Core Network in order to provide services. Based on operator deployment, Application Functions considered to be trusted by the operator can be allowed to interact directly with relevant Network Functions. Application Functions not allowed by the operator to access directly the Network Functions shall use the external exposure framework via the NEF to interact with relevant Network Functions.

In a 5G system, the data traffic is encapsulated and transmitted in QoS flow. The QoS Flow is the finest granularity for QoS forwarding treatment in the 5G system. All traffic mapped to the same 5G QoS flow receives the same forwarding treatment (e.g., scheduling policy, queue management policy, rate shaping policy, RLC configuration, etc.). Providing different QoS forwarding treatment requires separate 5G QoS flow.

A QoS flow may either be Guaranteed Bit Rate (GBR) or Non-GBR depending on its QoS profile. The QoS profile of a QoS flow is sent to the (R)AN and it contains QoS parameters. The QoS parameters includes an 5G QoS Identifier (5QI) and Allocation and Retention Priority (ARP), and other parameters such as Guaranteed Flow Bit Rate (GFBR), Maximum Flow Bit Rate (MFBR), etc. The 5QI is a scalar that is used as a reference to a specific QoS forwarding behavior (e.g., packet loss rate, packet delay budget). The 5QI can identify a set of QoS characteristics (Resource type (Non-GBR, GBR, Delay-critical GBR), Priority Level, Packet Delay Budget, Packet Error Rate, Averaging window, etc. The 5QI can be pre-configured 5QI or standardized 5QI.

Each QoS profile has one corresponding QoS flow identifier (QFI). User plane traffic with the same QFI within a PDU Session receives the same traffic forwarding treatment (e.g. scheduling, admission threshold). The QFI is carried in an encapsulation header on N3 (and N9) e.g., without any changes to the e2e packet header. The QFI is unique within a PDU session. The QFI may be dynamically assigned or may be equal to the 5QI.

Figure 4:
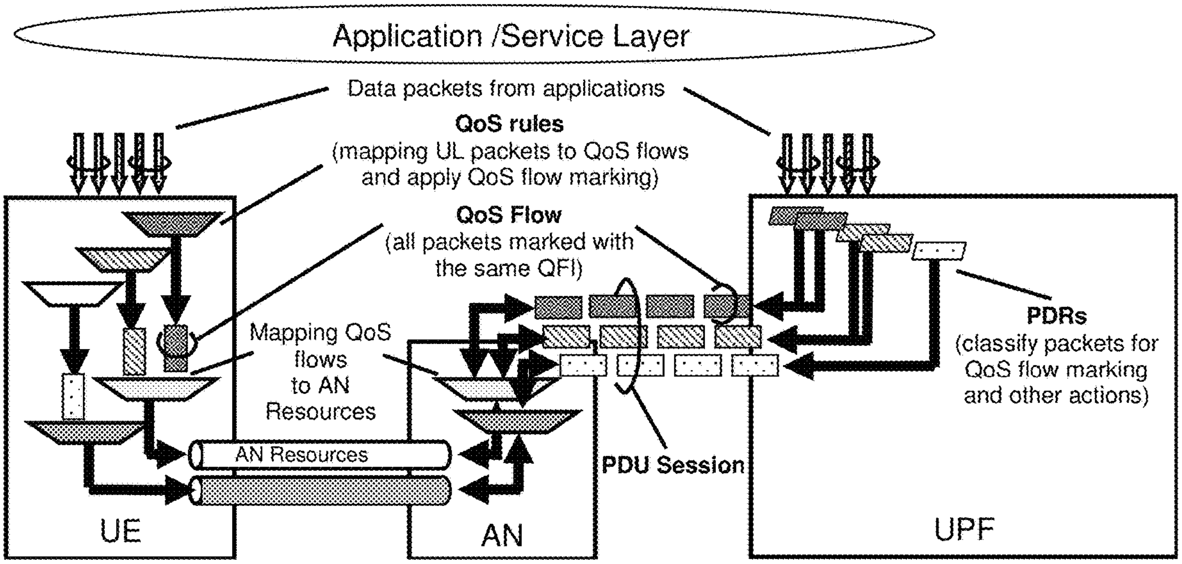
FIG. 4 shows classification and user plane marking for quality of service (QoS) flows and mapping to access network (AN) resources.

FIG. 4 shows classification and user plane marking for quality of service (QoS) flows and mapping to access network (AN) resources.

In a downlink (DL) transmission, incoming data packets are classified by the UPF based on the Packet Filter Sets of the DL PDRs in the order of their precedence. The UPF conveys the classification of the User Plane traffic belonging to a QoS Flow through an N3 (and N9) User Plane marking using a QFI. The AN binds QoS flows to AN resources (e.g., Data Radio Bearers of in the case of 3GPP RAN). There is no strict 1:1 relation between QoS flows and AN resources. It is up to the AN to establish the necessary AN resources that QoS Flows can be mapped to, and to release them.

In an uplink (UL) transmission, the UE evaluates UL packets against the UL Packet Filters in the Packet Filter Set in the QoS rules based on the precedence value of QoS rules in increasing order until a matching QoS rule (e.g., whose Packet Filter matches the UL packet) is found. The UE uses the QFI in the corresponding matching QoS rule to bind the UL packet to a QoS Flow. The UE then binds QoS flows to AN resources.

For XR/media services, a group of packets are used to carry payloads of a PDU set (e.g., a frame, video slice/tile). A PDU set is composed of one or more PDUs carrying the payload of one unit of information generated at the application level. In a media layer, packets in such a PDU set are decoded/handled as a whole. For example, the frame/video slice may only be decoded in case all or certain amount of the packets carrying the frame/video slice are successfully delivered. On the other hand, different PDU sets may have different importance. For example, I frame has a higher importance than the P frame or B frame. If the RAN is congested the RAN can drop the P frame or B frame but ensure the I frame to be transferred successful.

The disclosed technology can be implemented in some embodiments to provide a solution to enhance the existing QoS mechanism so the RAN can deliver the XR media service more efficiently.

In some embodiments of the disclosed technology, PDU Set ID and PDU Set Group ID can be used.

In some implementations, PDU Set ID is used to identify the PDU Set. All PDUs with same PDU Set ID are considered to belong to same PDU Set. This PDU Set ID is used to differentiate the PDUs between PDU Sets. For example, each PDU in I frame and B frame in the same group are identified by different PDU Set IDs. The PDU Set ID is unique within the QoS Flow or PDU Session.

In some implementations, PDU Set Group ID is used to identify the group of PDU Set. All PDUs with same PDU Set Group ID are considered to belong to the same group of PDU Set. This PDU Set Group ID is used to identify the dependency between PDU Sets. For example, the PDUs in I frame and B frame in the same group are identified by the same PDU Set Group ID. The PDU Set Group ID is unique within the PDU Session.

The PDU Set in the PDU Set Group may have different importance at the application level. The UPF can either bind the PDU Sets with different importance into same QoS flow and each PDU in the PDU Set is associated with an importance indication, or into different QoS flows with different priority.

In a downlink (DL) transmission, the UPF marks the DL PDU with PDU Set ID and PDU Set Group ID in the GTP-U header. If the UPF binds the PDU Sets with different importance into the same QoS flow, the UPF also marks an importance indication in the GTP-U header.

In some embodiments of the disclosed technology, the RAN can handle the DL GTP-U as follows.

When one PDU with a higher importance is missing, the RAN discards further PDUs with the same PDU Set Group ID in this QoS flow, or in different QoS flows of the PDU session, e.g., this will impact on other PDUs within the same PDU Set Group.

When one PDU with a lower importance is missing, the RAN discards further PDUs with the same PDU Set ID and same PDU Set Group ID in this QoS flow, e.g., this only impact on the PDUs in same PDU Set. PDUs in other PDU Set are not impacted.

In UL, the UE conveys the UL PDU with PDU Set ID, PDU Set Group ID and importance indication to the AS layer. The AS layer in the UE handles the UL PDU as follows.

When one PDU with a higher importance is missing, the AS layer in the UE discards further PDUs with the same PDU Set Group ID.

When one PDU with a lower importance is missing, the AS layer in the UE discards further PDUs with the same PDU Set ID and the same PDU Set Group ID in the same QoS flow.

Figure 5:
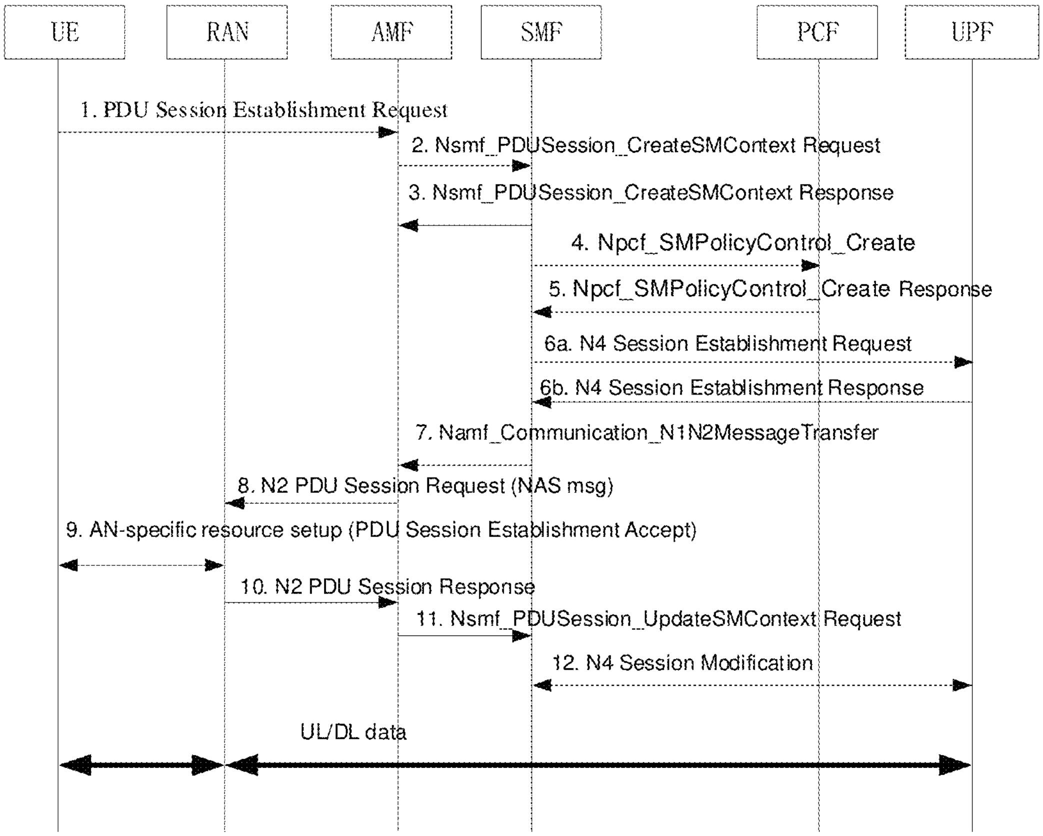
FIG. 5 shows an example of activation of extended reality (XR) optimization in user equipment (UE), radio access network (RAN) and user plane function (UPF) based on some embodiments of the disclosed technology.

FIG. 5 shows an example of activation of extended reality (XR) optimization in user equipment (UE), radio access network (RAN) and user plane function (UPF) based on some embodiments of the disclosed technology.

The disclosed technology can be implemented in some embodiments to activate the extended reality (XR) traffic transmission optimization in UE, RAN and UPF, as will be discussed below.

1. Non-Access Stratum (NAS) Message (e.g., DNN, PDU Session ID, N1 SM container (PDU Session Establishment Request)) is transmitted from UE to AMF. In order to establish a new PDU Session, the UE generates a new PDU Session ID. The UE initiates the UE Requested PDU Session Establishment procedure by the transmission of a NAS message containing a PDU Session Establishment Request within the N1 SM container. The NAS message may include a UE capability indication that the UE supports Extended reality traffic transmission optimization. The NAS message transmitted by the UE is encapsulated by the AN in a N2 message towards the AMF.
2. The AMF selects an SMF supporting the extended reality traffic transmission optimization based on the requested Data Network Name (DNN), the UE capability indication and other information. The AMF transmits Nsmf_PDUSession_CreateSMContext Request (SUPI, DNN, PDU Session ID, AMF ID, N1 SM container (PDU Session Establishment Request)). SUPI (Subscription Permanent Identifier) is used to uniquely identify the UE subscription. The AMF ID is the UE's GUAMI (Globally Unique AMF ID) which is used to uniquely identify the AMF serving the UE. The AMF forwards the PDU Session ID together with the N1 SM container containing the PDU Session Establishment Request received from the UE. The AMF may also forward the UE capability indication to the SMF.
3. If the SMF is able to process the PDU Session establishment request, the SMF creates a Session Management (SM) context and responds to the AMF by providing an SM Context Identifier in Nsmf_PDUSession_CreateSMContext Response.
4. The SMF determines that Policy and Charging Control (PCC) authorization is required and requests to establish an SM Policy Association with the PCF by invoking Npcf_SMPolicyControl_Create operation.
5. The PCF performs an authorization based on UE subscription and local configuration. The PCF answers with a Npcf_SMPolicyControl_Create response; in its response the PCF may provide policy information. The PCF may determine that this PDU session is used for XR traffic based on local configuration or information from the Application Function. In this case, the PCF includes XR information to activate the extended reality traffic transmission optimization in the UE, RAN and UPF. The XR information may include an indication to activate the extended reality traffic transmission optimization and Traffic Filters of the XR traffic. The Traffic Filters indicate how to detect the XR traffic, for example, the IP 5 tuple information of XR traffic, RTP header information, RTP pay-load information, RTCP header information, SRTP header information, SRTP pay-load information, SRTCP information, etc.
6. The SMF uses DNN, the UE capability indication received from AMF and the XR information from PCF to select an UPF supporting the Extended reality traffic transmission optimization. The SMF sends an N4 Session Establishment Request to the UPF and provides Packet detection, enforcement and reporting rules to be installed on the UPF for this PDU Session. The UPF acknowledges by sending an N4 Session Establishment Response. If core network (CN) tunnel information (Tunnel Info) is allocated by the UPF, the CN Tunnel Info is provided to SMF in this step.
7. Namf_Communication_N1N2MessageTransfer (PDU Session ID, N2 SM information (PDU Session ID, QFI(s), QoS Profile(s), N3 CN Tunnel Info), N1 SM container (PDU Session Establishment Accept)) are transmitted from SMF to AMF. The N2 SM information carries information that the AMF shall forward to the (R)AN which includes an indication to active the Extended reality traffic transmission optimization, the N3 CN Tunnel Info corresponds to the Core Network address of the N3 tunnel corresponding to the PDU Session, the QoS profiles and the corresponding QFI (QoS Flow Identifier) and the PDU Session ID. The N1 SM container contains the PDU Session Establishment Accept that the AMF shall provide to the UE. The PDU Session Establishment Accept may also include an indication to active the Extended reality traffic transmission optimization.
8. N2 PDU Session Request (N2 SM information, NAS message (PDU Session ID, N1 SM container (PDU Session Establishment Accept))) is transmitted from AMF to RAN. The AMF sends the NAS message containing PDU Session ID and PDU Session Establishment Accept targeted to the UE and the N2 SM information received from the SMF within the N2 PDU Session Request to the 5G access network (AN).
9. Between RAN and UE, the RAN may issue AN specific signaling exchange with the UE that is related with the information received from SMF. For example, in case of a 3GPP RAN, an RRC Connection Reconfiguration may take place with the UE establishing the necessary RAN resources related to the QoS Rules for the PDU Session request. RAN forwards the NAS message (PDU Session ID, N1 SM container (PDU Session Establishment Accept)) to the UE. RAN also allocates AN N3 tunnel information for the PDU Session.
10. N2 PDU Session Response (PDU Session ID, Cause, N2 SM information (PDU Session ID, AN Tunnel Info, List of accepted/rejected QFI(s))) is transmitted from RAN to AMF. If the RAN receives an indication to active the extended reality traffic transmission optimization and the RAN supports Extended reality traffic transmission optimization, the RAN sends an indication in the N2 SM information that the extended reality traffic transmission optimization has been activated in the RAN.

In some implementations, access network (AN) tunnel information (Tunnel Info) corresponds to the Access Network address of the N3 tunnel corresponding to the PDU Session.

11. Nsmf_PDUSession_UpdateSMContext Request (N2 SM information) is transmitted from AMF to SMF.

In some implementations, the AMF forwards the N2 SM information received from (R)AN to the SMF. If the list of rejected QFI(s) is included in N2 SM information, the SMF releases the rejected QFI(s) associated QoS profiles.

12. The SMF initiates an N4 Session Modification procedure with the UPF. The SMF provides AN Tunnel Info to the PSA/UPF0 as well as the corresponding forwarding rules. If the RAN sends indication that the extended reality traffic transmission optimization has been activated, the SMF provides the information to the UPF to activate the Extended reality traffic transmission optimization. The information may include Traffic Filters of the XR traffic in the Packet detection rule and an indication to activate the Extended reality traffic transmission optimization.

After this step, the PDU Session is successfully established. The UE may obtain IP addresses via the user plane of established PDU Session. UE/UPF starts to use the established user plane for uplink and downlink XR data transmission as follows.

In a downlink (DL) transmission, the UPF allocates PDU Set Group ID when it detects the first PDU of the PDU Set Group. The UPF also allocates PDU Set ID when it detects the first PDU of the PDU Set. The UPF binds the DL PDU into QoS flow and adds the PDU Set Group ID and PDU Set ID in the GTP-U header of the PDU. If UPF binds the DL PDU with different importance into the same QoS flow, the UPF also adds an importance indication to the GTP-U header of the PDU. The importance indication indicates whether the PDU can be dropped in RAN congestion case. In some implementations, the PDU Set Group ID, PDU Set ID and an importance indication of the DL PDU are not sent to the UE.

In an uplink transmission (UL), the UE allocates PDU Set Group ID when it sends the first PDU of the PDU Set Group. The UE also allocates PDU Set ID when it sends the first PDU of the PDU Set. The UE conveys the PDU to AS layer together with the PDU Set Group ID, PDU Set ID and an importance indication. The PDU Set Group ID, PDU Set ID and an importance indication of the UL PDU are not sent to the RAN node.

Figure 6A:
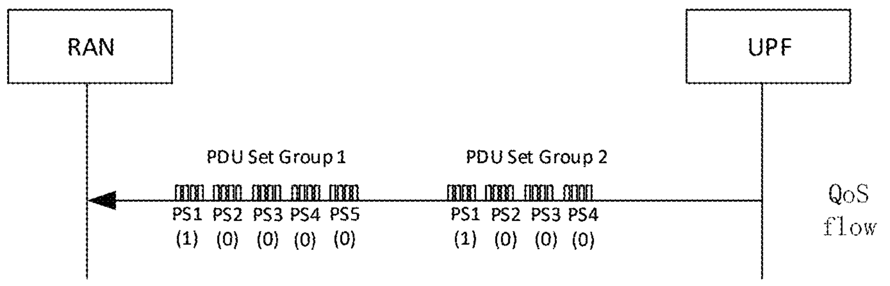
FIG. 6A shows binding downlink (DL) protocol data unit (PDU) with different importance into the same QoS flow based on some embodiments of the disclosed technology.
Figure 6B:
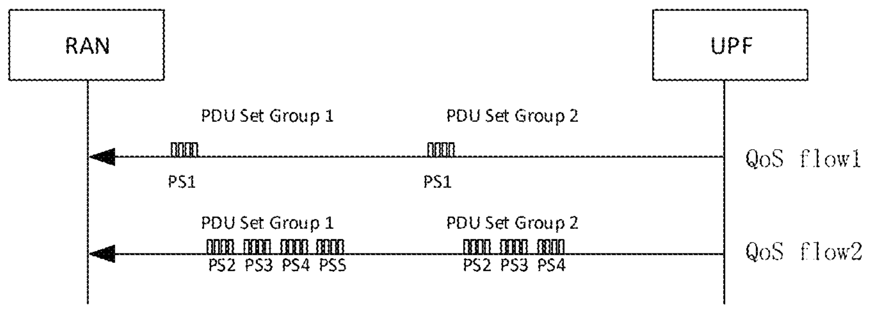
FIG. 6B shows binding downlink (DL) protocol data unit (PDU) with different importance into different QoS flows based on some embodiments of the disclosed technology.

FIG. 6A shows UPF binds downlink (DL) protocol data unit (PDU) with different importance into the same QoS flow based on some embodiments of the disclosed technology. FIG. 6B shows UPF binds downlink (DL) protocol data unit (PDU) with different importance into different QoS flows based on some embodiments of the disclosed technology.

Referring to FIG. 6A, the PDU Set Group 1 has 5 PDU Sets and PDU Set Group 2 has 4 PDU Sets. Both groups are delivered within the same QoS flow. There are multiple PDUs in each PDU Set. In both groups, the PDU Set 1 is more important than other PDU Sets in the group, and thus all PDUs in the PDU Set 1 are marked as more important, e.g., the importance indication of the PDU Set 1 is set to 1 while others are set to 0. In this way, the RAN can know which PDU Sets are more important.

Referring to FIG. 6B, the PDU Set Group 1 has 5 PDU Sets and PDU Set Group 2 has 4 PDU Sets. There are multiple PDUs in each PDU Set. In both groups the PDU Set 1 is more important than other PDU Sets in the group. QoS flow 1 has a higher priority than QoS flow 2, and thus PDUs in PDU Set 1 in both groups are bound to QoS flow 1, while PDUs in other PDU Sets are bound to QoS flow 2. In this way the RAN can know which PDU Sets are more important.

Figure 7A:
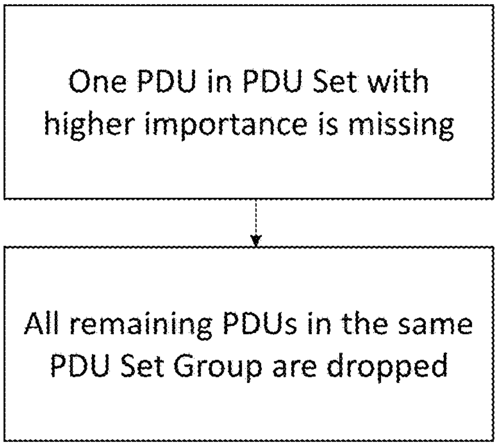
FIG. 7A shows when one PDU in PDU set with higher importance is missing, all remaining PDUs in the same PDU set group are dropped based on some embodiments of the disclosed technology.
Figure 7B:
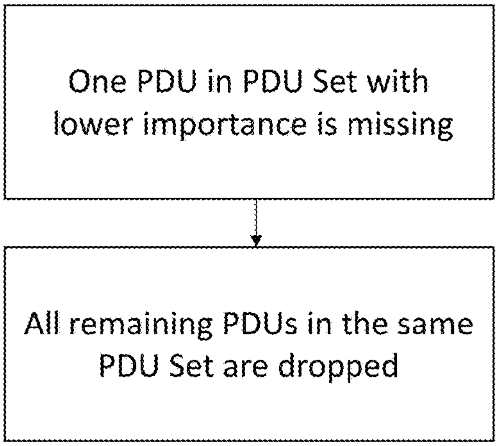
FIG. 7B shows one PDU in PDU set with lower importance is missing, all remaining PDUs in the same PDU Set are dropped based on some embodiments of the disclosed technology.

FIG. 7A shows when one PDU in PDU set with a higher importance is missing, all remaining PDUs in the same PDU set group are dropped based on some embodiments of the disclosed technology. FIG. 7B shows one PDU in PDU set with lower importance is missing, all remaining PDUs in the same PDU Set are dropped based on some embodiments of the disclosed technology.

Referring to FIG. 7A, when one PDU in the PDU Set with a higher importance is missing, the RAN discards further PDUs with the same PDU Set Group ID. The dropped PDU can belong to the same QoS flow or different QoS flows of the PDU Session.

Referring to FIG. 7B, when one PDU in the PDU Set with a lower importance is missing, the RAN discards further PDUs with the same PDU Set ID in the same PDU Set Group. The dropped PDUs belong to the same QoS flow.

When the RAN drops DL packets, the RAN sends a report/notification to SMF to report the number of dropped DL packets so the SMF can report to the charging system.

For an uplink (UL) transmission, the UE performs extended reality traffic transmission optimization by conveying the UL PDU with PDU Set ID, PDU Set Group ID and importance indication to the AS layer. When one PDU in PDU Sets with a higher importance is missing, the AS layer in the UE discards further PDUs with the same PDU Set Group ID. When one PDU in PDU Sets with a lower importance is missing, the AS layer in the UE discards further PDUs with the same PDU Set ID and the same PDU Set Group ID in the same QoS flow.

In some embodiments of the disclosed technology, SMF receives an indication of activation of extended reality traffic transmission optimization from PCF, sends extended reality traffic transmission optimization activation request to the RAN, receives the result of extended reality traffic transmission optimization activation from RAN, and activates the extended reality traffic transmission optimization in UPF.

In addition, SMF receives an indication of extended reality traffic transmission optimization support from the UE, and sends an indication of activation of extended reality traffic transmission optimization to the UE.

In some embodiments of the disclosed technology, UPF receives an indication of activation of extended reality traffic transmission optimization from the network, allocates PDU Set ID and PDU Set Group ID for the first downlink packet of the PDU Set Group, sends the PDU Set ID and PDU Set Group ID together with the downlink packet to the RAN.

In addition, the UPF sends an importance indication together with the downlink packet to the RAN.

In some embodiments of the disclosed technology, RAN receives an indication of activation of extended reality traffic transmission optimization from the network, detects that a downlink packet is missing, drops the remaining downlink packets in the same PDU Set or the remaining downlink packets in the same PDU Set Group, according to the importance of the lost downlink packet.

In addition, RAN determines the importance of the missing downlink packets according to the priority of the QoS flow over which the downlink packet is sent.

In addition, RAN determines the importance of the missing downlink packets according to the importance indication sent together with the downlink packet.

In some embodiments of the disclosed technology, UE sends the indication of extended reality traffic transmission optimization support to the network, receives an indication of activation of extended reality traffic transmission optimization from the network, detects that uplink packets are missing, drops the remaining uplink packets in the same PDU Set or the remaining uplink packets in the same PDU Set Group, according to the importance of the missing uplink packet.

Figure 8:
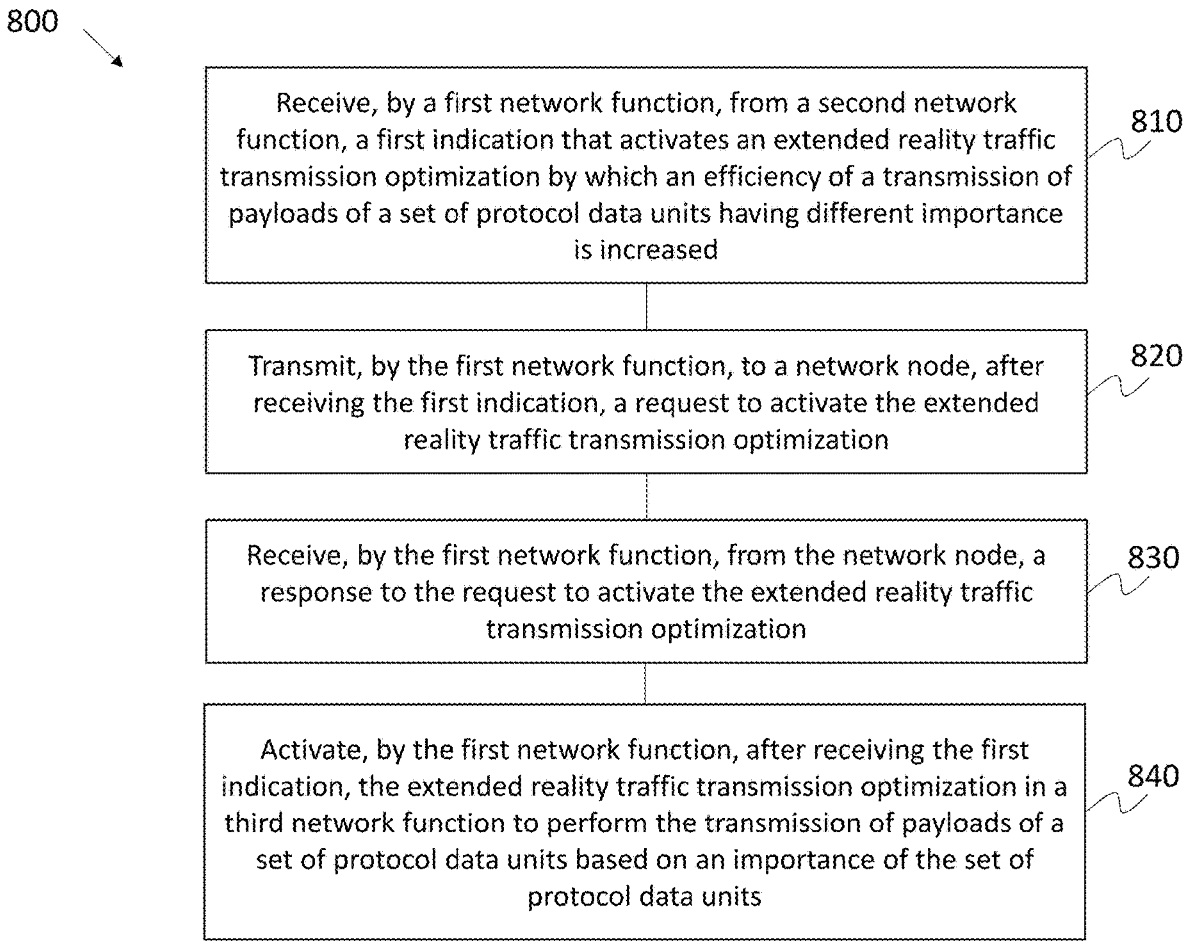
FIG. 8 shows an example of a process for wireless communication based on some example embodiments of the disclosed technology.

FIG. 8 shows an example of a process for wireless communication based on some example embodiments of the disclosed technology.

In some implementations, the process 800 for wireless communication may include, at 810, receiving, by a first network function, from a second network function, a first indication that activates an extended reality traffic transmission optimization by which an efficiency of a transmission of payloads of a set of protocol data units having different importance is increased, at 820, transmitting, by the first network function, to a network node, after receiving the first indication, a request to activate the extended reality traffic transmission optimization, at 830, receiving, by the first network function, from the network node, a response to the request to activate the extended reality traffic transmission optimization, and at 840, activating, by the first network function, after receiving the first indication, the extended reality traffic transmission optimization in a third network function to perform the transmission of payloads of a set of protocol data units based on an importance of the set of protocol data units.

In some implementations, the first network function is a session management function (SMF), the second network function is a policy control function (PCF), the third network function is a user plane function (UPF), and the network node is a radio access network (RAN).

Figure 9:
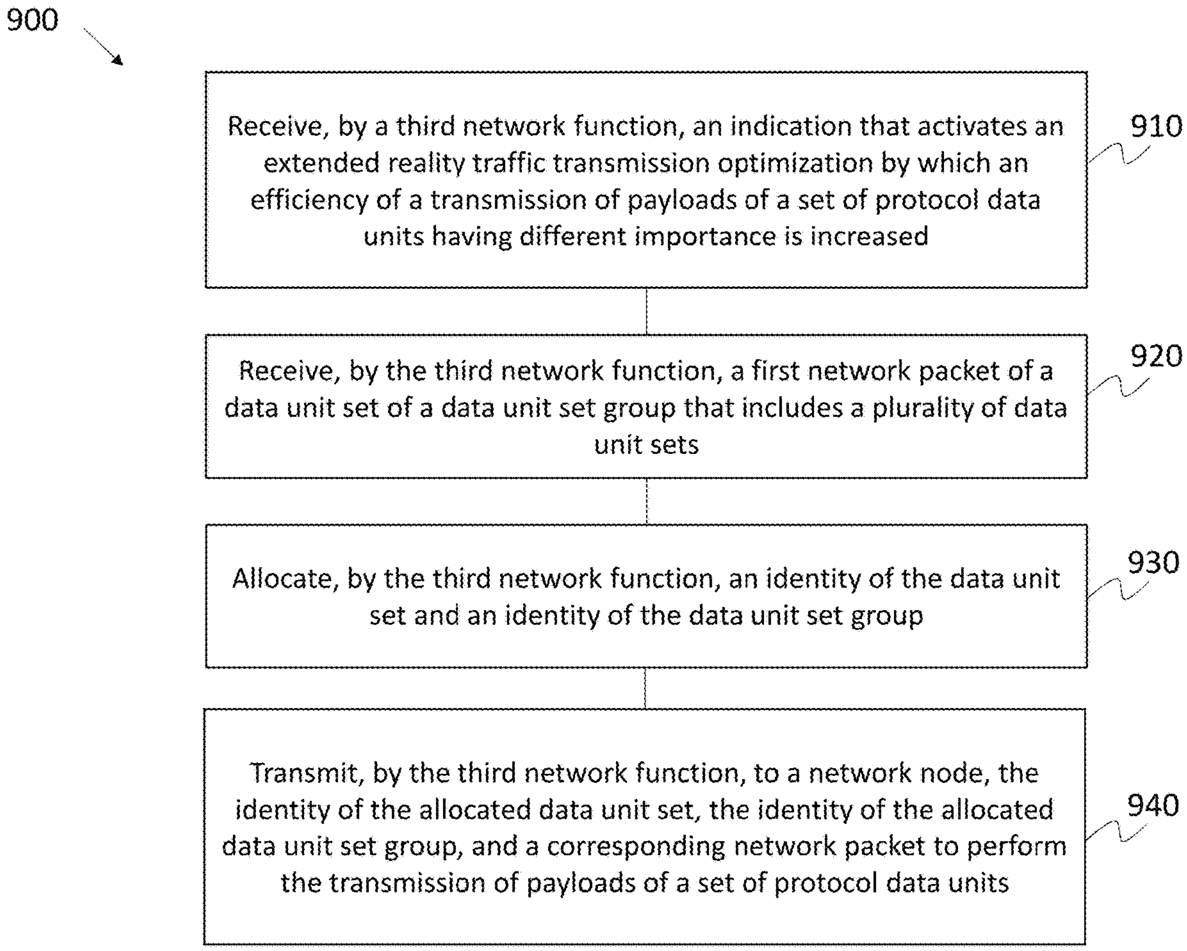
FIG. 9 shows another example of a process for wireless communication based on some example embodiments of the disclosed technology.

FIG. 9 shows another example of a process for wireless communication based on some example embodiments of the disclosed technology.

In some implementations, the process 900 for wireless communication may include, at 910, receiving, by a third network function, an indication that activates an extended reality traffic transmission optimization by which an efficiency of a transmission of payloads of a set of protocol data units having different importance is increased, at 920, receiving, by the third network function, a first network packet of a data unit set of a data unit set group that includes a plurality of data unit sets, at 930, allocating, by the third network function, an identity of the data unit set and an identity of the data unit set group, and at 940, transmitting, by the third network function, to a network node, the identity of the allocated data unit set, the identity of the allocated data unit set group, and a corresponding network packet to perform the transmission of payloads of a set of protocol data units.

In some implementations, the third network function is a user plane function (UPF), and the network node is a radio access network (RAN).

Figure 10:
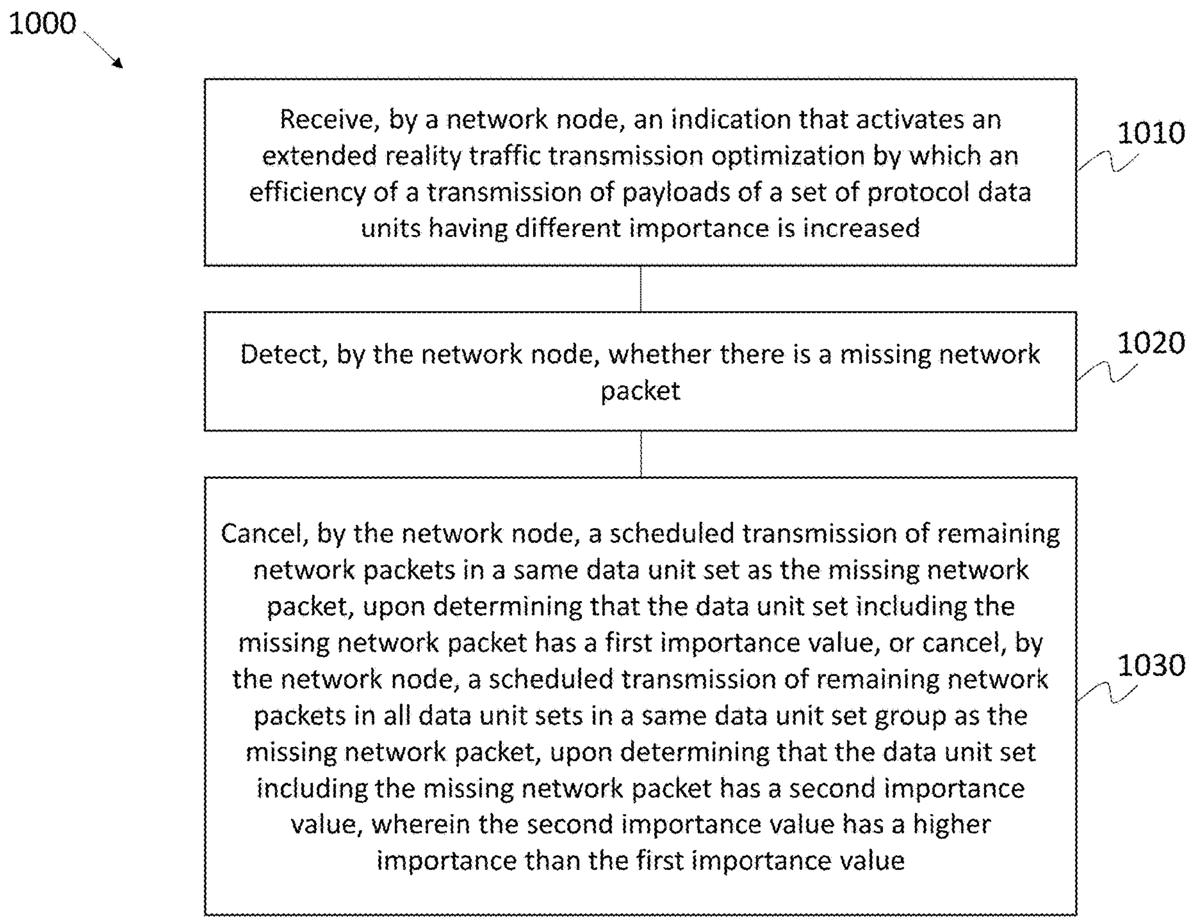
FIG. 10 shows another example of a process for wireless communication based on some example embodiments of the disclosed technology.

FIG. 10 shows another example of a process for wireless communication based on some example embodiments of the disclosed technology.

In some implementations, the process 1000 for wireless communication may include, at 1010, receiving, by a network node, an indication that activates an extended reality traffic transmission optimization by which an efficiency of a transmission of payloads of a set of protocol data units having different importance is increased, at 1020, detecting, by the network node, whether there is a missing network packet, and at 1030, canceling, by the network node, a scheduled transmission of remaining network packets in a same data unit set as the missing network packet, upon determining that the data unit set including the missing network packet has a first importance value, or canceling, by the network node, a scheduled transmission of remaining network packets in all data unit sets in a same data unit set group as the missing network packet, upon determining that the data unit set including the missing network packet has a second importance value, wherein the second importance value has a higher importance than the first importance value.

In some implementations, the network node is a radio access network (RAN).

Figure 11:
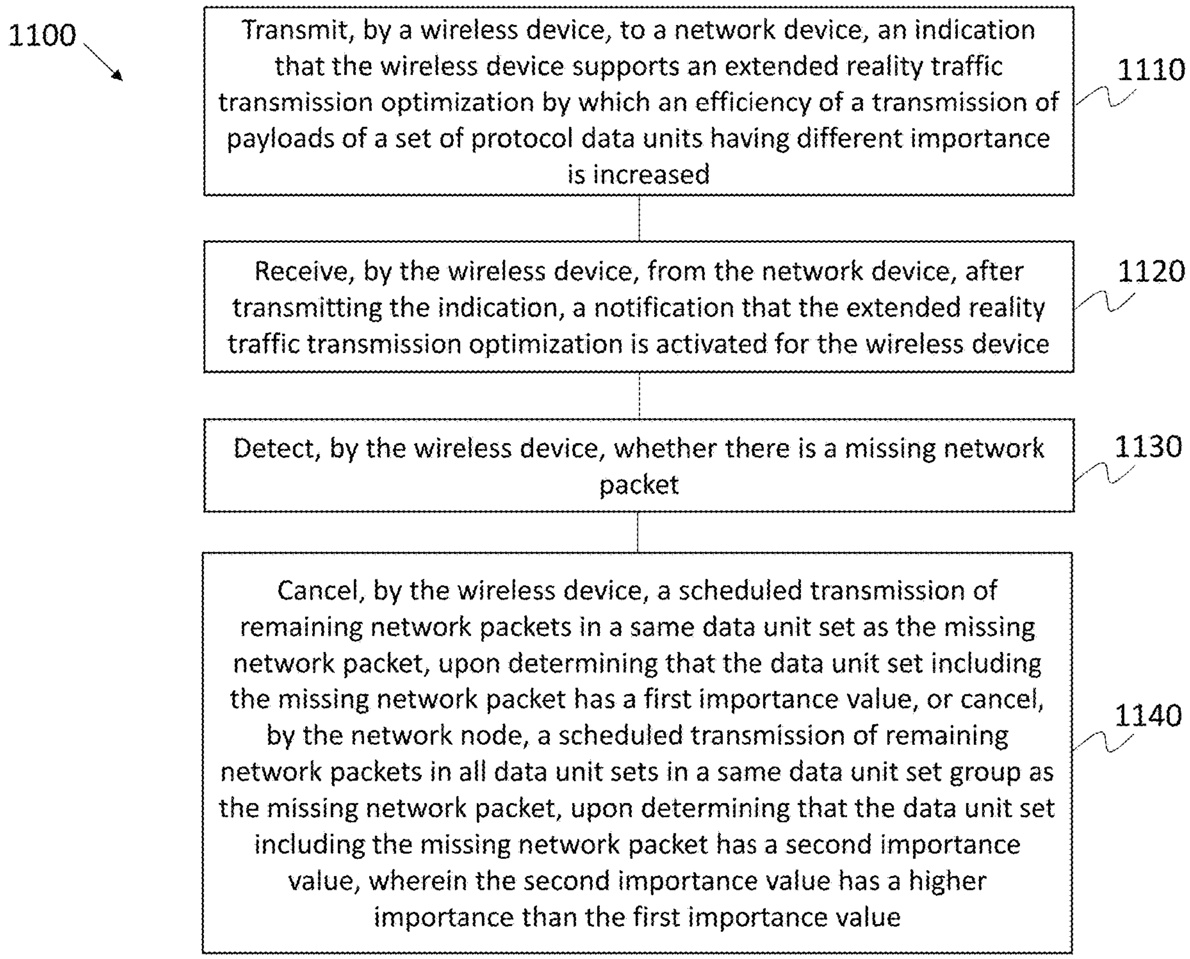
FIG. 11 shows another example of a process for wireless communication based on some example embodiments of the disclosed technology.

FIG. 11 shows another example of a process for wireless communication based on some example embodiments of the disclosed technology.

In some implementations, the process 1100 for wireless communication may include, at 1110, transmitting, by a wireless device, to a network device, an indication that the wireless device supports an extended reality traffic transmission optimization by which an efficiency of a transmission of payloads of a set of protocol data units having different importance is increased, at 1120, receiving, by the wireless device, from the network device, after transmitting the indication, a notification that the extended reality traffic transmission optimization is activated for the wireless device, at 1130, detecting, by the wireless device, whether there is a missing network packet, and at 1140, canceling, by the wireless device, a scheduled transmission of remaining network packets in a same data unit set as the missing network packet, upon determining that the data unit set including the missing network packet has a first importance value, or canceling, by the network node, a scheduled transmission of remaining network packets in all data unit sets in a same data unit set group as the missing network packet, upon determining that the data unit set including the missing network packet has a second importance value, wherein the second importance value has a higher importance than the first importance value.

It will be appreciated that the present document discloses techniques that can be embodied in various embodiments to determine downlink control information in wireless networks. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the embodiments above and throughout this document. As used in the clauses below and in the claims, a wireless device may be user equipment, mobile station, or any other wireless terminal including fixed nodes such as base stations. A network device includes a base station including a next generation Node B (gNB), enhanced Node B (eNB), or any other device that performs as a base station.

Clause 1. A method of wireless communication, comprising: receiving, by a first network function, from a second network function, a first indication that activates an extended reality traffic transmission optimization by which an efficiency of a transmission of payloads of a set of protocol data units having different importance is increased; transmitting, by the first network function, to a network node, after receiving the first indication, a request to activate the extended reality traffic transmission optimization; receiving, by the first network function, from the network node, a response to the request to activate the extended reality traffic transmission optimization; and activating, by the first network function, after receiving the first indication, the extended reality traffic transmission optimization in a third network function to perform the transmission of payloads of a set of protocol data units based on an importance of the set of protocol data units.

Clause 2. The method of clause 1, further comprising: receiving, by the first network function, from a wireless device, a second indication that the wireless device supports the extended reality traffic transmission optimization; and transmitting, by the first network function, to the wireless device, an indication to activate the extended reality traffic transmission optimization for the wireless device.

Clause 3. The method of any of clauses 1-2, wherein the first network function is a session management function (SMF).

Clause 4. The method of clause 3, wherein the SMF is selected by an access and mobility management function (AMF).

Clause 5. The method of clause 4, wherein the AMF forwards the second indication to the SMF.

Clause 6. The method of any of clauses 1-2, wherein the second network function is a policy control function (PCF).

Clause 7. The method of clause 6, wherein the PCF determines that a protocol data unit (PDU) session is used for an extended reality traffic based on a local configuration or information from an application function.

Clause 8. The method of clause 7, wherein the PCF includes extended reality information to activate the extended reality traffic transmission optimization.

Clause 9. The method of clause 8, wherein the extended reality information includes an indication to activate the extended reality traffic transmission optimization and a traffic filter of the extended reality traffic.

Clause 10. The method of clause 9, wherein the traffic filter includes information as to how to detect the extended reality traffic, wherein the information includes at least one of: an IP 5 tuple information of the extended reality traffic, real-time transport protocol (RTP) header information, RTP pay-load information, RTP control protocol (RTCP) header information, secure real-time transport protocol (SRTP) header information, SRTP pay-load information, or SRTP control protocol (SRTCP) information.

Clause 11. The method of clause 1, wherein, in a case that the network node supports the extended reality traffic transmission optimization and receives the request, the network node indicates that the extended reality traffic transmission optimization has been activated in the network node.

Clause 12. The method of clause 11, further comprising transmitting, by first network function, to the third network function, information for activating the extended reality traffic transmission optimization, wherein the information for activating the extended reality traffic transmission optimization includes a traffic filter of the extended reality traffic in a packet detection rule and an indication to activate the extended reality traffic optimization.

Clause 13. A method of wireless communication, comprising: receiving, by a third network function, an indication that activates an extended reality traffic transmission optimization by which an efficiency of a transmission of payloads of a set of protocol data units having different importance is increased; receiving, by the third network function, a first network packet of a data unit set of a data unit set group that includes a plurality of data unit sets; allocating, by the third network function, an identity of the data unit set and an identity of the data unit set group; and transmitting, by the third network function, to a network node, the identity of the allocated data unit set, the identity of the allocated data unit set group, and a corresponding network packet to perform the transmission of payloads of a set of protocol data units.

Clause 14. The method of clause 13, further comprising: determining, by the third network function, an importance of the corresponding data unit set in the data unit set group; and transmitting, by the third network function, to the network node, an indication regarding the importance of the corresponding data unit set in the data unit set group.

Clause 15. The method of clause 13, further comprising: determining, by the third network function, an importance of the corresponding data unit set in the data unit set group; determining, by the third network function, a quality of service (QoS) flow associated with the importance of the corresponding data unit set; and transmitting, by the third network function, to the network node, the corresponding data unit set over the QoS flow.

Clause 16. The method of any of clauses 13-15, wherein the network packet includes a downlink protocol data unit (PDU).

Clause 17. The method of any of clauses 13-16, wherein the data unit set includes a protocol data unit (PDU) set, the data unit set identity includes a PDU set identity (ID) for identifying a PDU set, and the data unit set group identity includes a PDU set group ID for identifying a group of PDU sets.

Clause 18. The method of clause 17, wherein the PDU set ID, the PDU set group ID and an importance indication are transmitted in a general packet radio service (GPRS) tunneling protocol user plane (GTP-U) header of a corresponding PDU.

Clause 19. The method of clause 18, wherein the importance indication indicates whether to cancel a transmission of the PDU in a radio access network (RAN) congestion case.

Clause 20. A method of wireless communication, comprising: receiving, by a network node, an indication that activates an extended reality traffic transmission optimization by which an efficiency of a transmission of payloads of a set of protocol data units having different importance is increased; detecting, by the network node, whether there is a missing network packet; and canceling, by the network node, a scheduled transmission of remaining network packets in a same data unit set as the missing network packet, upon determining that the data unit set including the missing network packet has a first importance value, or canceling, by the network node, a scheduled transmission of remaining network packets in all data unit sets in a same data unit set group as the missing network packet, upon determining that the data unit set including the missing network packet has a second importance value, wherein the second importance value has a higher importance than the first importance value.

Clause 21. The method of clause 20, further comprising: determining, by the network node, the importance of the data unit set based on a priority of a quality of service (QoS) flow over which the network packet is transmitted.

Clause 22. The method of clause 20, further comprising: receiving, by the network node, an importance indication associated with an importance of network packets; and determining, by the network node, an importance of the missing network packet based on the importance indication.

Clause 23. The method of any of clauses 20-22, wherein the network packet includes a downlink protocol data unit (PDU).

Clause 24. A method of wireless communication, comprising: transmitting, by a wireless device, to a network device, an indication that the wireless device supports an extended reality traffic transmission optimization by which an efficiency of a transmission of payloads of a set of protocol data units having different importance is increased; receiving, by the wireless device, from the network device, after transmitting the indication, a notification that the extended reality traffic transmission optimization is activated for the wireless device; detecting, by the wireless device, whether there is a missing network packet; and canceling, by the wireless device, a scheduled transmission of remaining network packets in a same data unit set as the missing network packet, upon determining that the data unit set including the missing network packet has a first importance value, or canceling, by the network node, a scheduled transmission of remaining network packets in all data unit sets in a same data unit set group as the missing network packet, upon determining that the data unit set including the missing network packet has a second importance value, wherein the second importance value has a higher importance than the first importance value.

Clause 25. The method of clause 24, wherein the network packet includes a downlink packet.

Clause 26. The method of clause 25, wherein the data unit set includes a protocol data unit (PDU) set, the data unit set identity includes a PDU set identity (ID) for identifying a PDU set, and the data unit set group identity includes a PDU set group ID for identifying a group of PDU sets.

Clause 27. The method of clause 26, further comprising: allocating, by the wireless device, the PDU set group ID upon transmitting a first protocol data unit (PDU) of the protocol data unit (PDU) set group.

Clause 28. The method of clause 26, further comprising: allocating, by the wireless device, the PDU set ID upon transmitting a first protocol data unit (PDU) of the protocol data unit (PDU) set group.

Clause 29. The method of clause 26, further comprising: transmitting, by the wireless device, to an access stratum (AS) layer, the PDU, the PDU set group ID, the PDU set ID, and an importance indication associated with an importance of PDU.

Clause 30. The method of clause 24, wherein the indication that the wireless device supports the extended reality traffic transmission optimization is carried by a non-access stratum (NAS) message.

Clause 31. The method of any of clauses 1-30, wherein the first network function is a session management function (SMF), the second network function is a policy control function (PCF), the third network function is a user plane function (UPF).

Clause 32. The method of any of clauses 1-30, wherein the network node is a radio access network (RAN).

Clause 33. The method of any of clauses 1-30, wherein the wireless device is user equipment (UE).

Clause 34. An apparatus for wireless communication, comprising a processor that is configured to carry out the method of any of clauses 1 to 33.

Clause 35. An apparatus for wireless communication, comprising a memory and a processor, wherein the processor reads code from the memory and implements a method recited in any of clauses 1 to 33.

Clause 36. A non-transitory computer readable medium having code stored thereon, the code when executed by a processor, causing the processor to implement a method recited in any of clauses 1 to 33.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some implementations be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:

receiving, by a first network function, from a second network function, a first indication that activates an extended reality traffic transmission optimization by which an efficiency of a transmission of payloads of a set of protocol data units having different importance is increased;

transmitting, by the first network function, to a network node, after receiving the first indication, a request to activate the extended reality traffic transmission optimization;

receiving, by the first network function, from the network node, a response to the request to activate the extended reality traffic transmission optimization; and activating, by the first network function, after receiving the first indication, the extended reality traffic transmission optimization in a third network function to perform the transmission of payloads of a set of protocol data units based on an importance of the set of protocol data units.

2. The method of claim 1, further comprising:

receiving, by the first network function, from a wireless device, a second indication that the wireless device supports the extended reality traffic transmission optimization; and transmitting, by the first network function, to the wireless device, an indication to activate the extended reality traffic transmission optimization for the wireless device.

3. The method of claim 1, wherein the first network function is a session management function (SMF).

4. The method of claim 3, wherein the SMF is selected by an access and mobility management function (AMF).

5. The method of claim 1, wherein the second network function is a policy control function (PCF), and the third network function is a user plane function (UPF).

6. The method of claim 5, wherein the PCF determines that a protocol data unit (PDU) session is used for an extended reality traffic based on a local configuration or information from an application function.

7. The method of claim 1, wherein, in a case that the network node supports the extended reality traffic transmission optimization and receives the request, the network node indicates that the extended reality traffic transmission optimization has been activated in the network node.

8. The method of claim 7, further comprising transmitting, by first network function, to the third network function, information for activating the extended reality traffic transmission optimization, wherein the information for activating the extended reality traffic transmission optimization includes a traffic filter of the extended reality traffic in a packet detection rule and an indication to activate the extended reality traffic optimization.

9. A method of wireless communication, comprising:

receiving, by a network node, an indication that activates an extended reality traffic transmission optimization by which an efficiency of a transmission of payloads of a set of protocol data units having different importance is increased;

detecting, by the network node, whether there is a missing network packet; and canceling, by the network node, a scheduled transmission of remaining network packets in a same data unit set as the missing network packet, upon determining that the data unit set including the missing network packet has a first importance value, or canceling, by the network node, a scheduled transmission of remaining network packets in all data unit sets in a same data unit set group as the missing network packet, upon determining that the data unit set including the missing network packet has a second importance value, wherein the second importance value has a higher importance than the first importance value.

10. The method of claim 9, further comprising:

determining, by the network node, the importance of the data unit set based on a priority of a quality of service (QoS) flow over which the network packet is transmitted.

11. The method of claim 9, further comprising:

receiving, by the network node, an importance indication associated with an importance of network packets; and determining, by the network node, an importance of the missing network packet based on the importance indication.

12. The method of claim 9, wherein the network packet includes a downlink protocol data unit (PDU).

13. A method of wireless communication, comprising:

transmitting, by a wireless device, to a network device, an indication that the wireless device supports an extended reality traffic transmission optimization by which an efficiency of a transmission of payloads of a set of protocol data units having different importance is increased;

receiving, by the wireless device, from the network device, after transmitting the indication, a notification that the extended reality traffic transmission optimization is activated for the wireless device;

detecting, by the wireless device, whether there is a missing network packet; and canceling, by the wireless device, a scheduled transmission of remaining network packets in a same data unit set as the missing network packet, upon determining that the data unit set including the missing network packet has a first importance value, or canceling, by a network node, a scheduled transmission of remaining network packets in all data unit sets in a same data unit set group as the missing network packet, upon determining that the data unit set including the missing network packet has a second importance value, wherein the second importance value has a higher importance than the first importance value.

14. The method of claim 13, wherein the network packet includes a downlink packet.

15. The method of claim 14, wherein the data unit set includes a protocol data unit (PDU) set, a data unit set identity includes a PDU set identity (ID) for identifying a PDU set, and a data unit set group identity includes a PDU set group ID for identifying a group of PDU sets.

16. The method of claim 15, further comprising:

allocating, by the wireless device, the PDU set group ID upon transmitting a first protocol data unit (PDU) of the protocol data unit (PDU) set group.

17. The method of claim 15, further comprising:

allocating, by the wireless device, the PDU set ID upon transmitting a first protocol data unit (PDU) of the protocol data unit (PDU) set group.

18. The method of claim 15, further comprising:

transmitting, by the wireless device, to an access stratum (AS) layer, the PDU, the PDU set group ID, the PDU set ID, and an importance indication associated with an importance of PDU.

19. The method of claim 13, wherein the indication that the wireless device supports the extended reality traffic transmission optimization is carried by a non-access stratum (NAS) message.

20. An apparatus for wireless communication, comprising a memory and at least one processor, wherein the at least one processor reads code from the memory and implements the method recited in claim 14.

* * * * *